US007555017B2

(12) United States Patent
Shay et al.

(10) Patent No.: US 7,555,017 B2
(45) Date of Patent: Jun. 30, 2009

(54) LOW LATENCY DIGITAL AUDIO OVER PACKET SWITCHED NETWORKS

(75) Inventors: Gregory F. Shay, Mentor, OH (US); Steven Gray Church, Avon Lake, OH (US)

(73) Assignee: TLS Corporation, Cleveland, OH (US)

( * ) Notice: Subject to any disclaimer, the term of this patent is extended or adjusted under 35 U.S.C. 154(b) by 1123 days.

(21) Appl. No.: 10/406,396

(22) Filed: Apr. 3, 2003

(65) Prior Publication Data

US 2004/0114607 A1    Jun. 17, 2004

Related U.S. Application Data

(60) Provisional application No. 60/433,922, filed on Dec. 17, 2002.

(51) Int. Cl.
*H04J 3/06* (2006.01)
(52) U.S. Cl. .................................. 370/510; 370/395.62
(58) Field of Classification Search ................. 370/429, 370/428, 412, 235, 503–515, 350, 345.62, 370/520, 395.62
See application file for complete search history.

(56) References Cited

U.S. PATENT DOCUMENTS

| 4,707,829 | A | | 11/1987 | Pendse | |
|---|---|---|---|---|---|
| 4,845,609 | A | * | 7/1989 | Lighthart et al. | 709/200 |
| 5,510,797 | A | * | 4/1996 | Abraham et al. | 342/352 |
| 5,510,979 | A | * | 4/1996 | Moderi et al. | 705/18 |
| 5,517,590 | A | * | 5/1996 | Auborn et al. | 385/32 |
| 5,517,690 | A | * | 5/1996 | Linquist et al. | 455/426.1 |
| 5,761,430 | A | | 6/1998 | Gross et al. | |
| 5,761,431 | A | * | 6/1998 | Gross et al. | 709/225 |
| 6,091,709 | A | * | 7/2000 | Harrison et al. | 370/235 |
| 6,161,138 | A | | 12/2000 | Gross et al. | |

(Continued)

FOREIGN PATENT DOCUMENTS

EP    1 006 686 A1    6/2000

OTHER PUBLICATIONS

Holmeide, Oyvind and Skeie, Tor, VoIP Drives Realtime Ethernet, journal, pp. 26-29.

(Continued)

*Primary Examiner*—Kwang B Yao
*Assistant Examiner*—Andrew Lai
(74) *Attorney, Agent, or Firm*—Tarolli, Sundheim, Covell & Tummino LLP (57) ABSTRACT

Method and Apparatus for delivering audio signals from a source node to a destination node on a network. The apparatus uses a number of switches that transmit prioritized data on a packet network. The switches are coupled to a number of send/receive nodes for sending and receiving digital audio signals on the data network. The audio packet size and the receive buffers are sized to store a minimum possible number of audio samples to minimize latency in processing audio signals arriving at said receive node, but still ensure audio delivery without interruption due to packet data network delay. An additional feature of the invention is recovery of clock synchronization over the same data network by novel arrangement of transmission of timing packets on the network. By sending a multiplicity of packets at irregular intervals a minimum network transit delay can be determined by each of the receive nodes which allows the receive nodes to filter out packet network transit delay error and maintain accurate local clocks.

4 Claims, 8 Drawing Sheets

U.S. PATENT DOCUMENTS

| | | | |
|---|---|---|---|
| 6,246,702 B1 * | 6/2001 | Fellman et al. | 370/503 |
| 6,438,702 B1 | 8/2002 | Hodge | |
| 6,611,519 B1 * | 8/2003 | Howe | 370/386 |
| 6,665,316 B1 * | 12/2003 | Eidson | 370/509 |
| 7,142,536 B1 * | 11/2006 | Gossett et al. | 370/360 |
| 2001/0038647 A1 * | 11/2001 | Bernath et al. | 370/503 |
| 2002/0186716 A1 * | 12/2002 | Eidson | 370/503 |
| 2003/0177154 A1 * | 9/2003 | Vrancic | 708/160 |
| 2003/0189953 A1 * | 10/2003 | Matsumura et al. | 370/503 |

OTHER PUBLICATIONS

Skeie, Tor, Johannessen, Svein and Holmeide, Oyvind, The Road to an End-to-End Deterministic Ethernet, Symposium, Aug. 28-30, 2002, pp. 3-9, 4th issue, Norway.

Karam, Mansour J. and Tobagi, Fouad A., Analysis of the Delay and Jitter of Voice Traffic Over the Internet, journal, 2001, pp. 824-833.

D.L. Mills, Measured Performance of the Network Time Protocol in the Internet System, journal, Oct. 1989, pp. 1-18, University of Delaware.

* cited by examiner

Fig.9

LOW LATENCY DIGITAL AUDIO OVER PACKET SWITCHED NETWORKS

CROSS REFERENCE TO RELATED APPLICATIONS

The present application claims priority from provisional application Ser. No. 60/433,922 filed Dec. 17, 2002.

FIELD OF THE INVENTION

The present invention concerns digital audio and more particularly a low latency means of transmitting digital audio signals over a network having multiple connections or nodes.

BACKGROUND ART

Computer networks are defined by their structure—bus, star, or some combination, and the organization of their bits—packets, continuous, or some combination.

Computer networks are almost always packet-based. That is because data is naturally bursty. A lot of data flows when a user opens a web page, but while he or she is reading it there is no data moving. Packets also let a number of terminals share the same wire.

In contrast, digital telephone networks are "circuit-switched"—a circuit is open for the duration of the connection. These two styles are good matches to the two data types, but there has developed a need to mix them up. If one has only a telephone line and wants to connect to the Internet, the data packets must be formatted and (usually) sent off to a modem. This works, but is inefficient because the line is held open and null data is being sent between the bursts of data that matter. If one wants to send audio over packet networks, the continuous audio data must be converted into packets and then the packets are reconverted into audio signals back together at the receiving end.

Efforts to improve this cumbersome process make sense because:

computer networks are much cheaper these days than circuit-oriented networks owing to their ubiquity and high-volume,
  it is often desirable to have both audio and data simultaneously on the same network,
  and computers are now very often either the source or destination for audio signals.

One example that illustrates a convergence of the two networks styles most clearly in the VOIP (Voice Over Internet Protocol) telephone application that is rapidly gaining popularity. The idea is that only one cable is needed to connect both a PC and a telephone. The switch that makes this happen is a cheap commodity Ethernet switch rather than an expensive proprietary PBX. The cost benefit is significant.

The same reasoning applies to the high-fidelity audio networks used in radio stations and other studio facilities, with their expensive PBX-like router switches at the core. Thus, the motive to use Ethernet for audio transmission.

Original Ethernet

Originally, Ethernet networks were packet networks, but by convention, Ethernet packets are also called frames, (not to be confused with the term audio frames used later in this application). These range from 72 to 1526 bytes, depending on the amount of data to be carried. The original Ethernet was based on a single shared coaxial cable—the Ether in Ethernet's name. The very first versions used a ½" thick cable with physical taps into it—one actually had to cut a little piece out of the jacket and screw in a metal part that made contact with the ground and center conductors. Later, the coax cable was smaller and T-connectors were used at the back of connected computers, but the principle remained the same. Even when Ethernet transitioned to telephone-style twisted-pair wires with a central hub, the medium was shared in the same way.

When a terminal was transmitting, it owned the full capacity of the cable. That means that there had to be some method to arbitrate access so that data from the various terminals didn't interfere with each other and that all had a chance to get on the bus and use a fair piece of the available bandwidth. This was done by the MAC—Media Access Controller—in each terminal. Robert Metcal invented the method at Xerox PARC in 1973. His mechanism senses when a collision occurs—collision detect. Upon detecting a collision, both data sending terminals would choose a random back-off time and then retransmit their packets with a good probability for success. The system also included a listen-before-talk function to reduce collisions—carrier sense. Using these methods, all terminals could access to the channel—multiple access. Put these all together and you understan why the Ethernat's channel access protocol is called a Carrier Sense Multiple Access with Collision Detect (CSMA/CD).

U.S. Pat. Nos. 6,161,138, 5,761,431, and 5,761,430 are assigned to Peak Audio. The technology disclosed in these patents allows audio signals to be reliably sent over the classic shared Ethernets. One of the connected terminals is set to be the "conductor" and sends a synchronizing packet onto the network that all terminals listen to. Then each terminal is assigned a timeslot on the network. The slots were offset in time with reference to the conductor's beat packet. That way, no collision or packet contention occur so that smooth audio flow is obtained. These patents describe the method of using a "beat clock" to control access to a shared network among audio terminals in a isochronous fashion so that each terminal puts its packets on the network in a prescribed time slot.

Switched Ethernet

While the marketing name has been retained and there is compatibility with the original Ethernet, modem, switched Ethernet is a fundamentally different technology. With a dedicated full-duplex connection from each terminal and a central switch that routes traffic, Ethernet is no longer a shared medium system—and therefore does not need or use a Media Access Controller and the associated CSMA/CD scheme. Network Interface Cards used with Ethernet switches automatically disable these functions.

The aforementioned three patents that are assigned to Peak Audio relate to the classic Ethernet CSMA/CD architecture with its shared medium approach and do not mention switched Ethernets. Peak Audio is presently marketing an audio networking system under the designation CobraNet which is used over switched networks and may benefit from the switched Ethernet architecture because it may provide more aggregate bandwidth and thus more audio channels are possible. However, CobraNet does not use switched Ethernet efficiently when audio and data share a link. Cobranet must route any data that shares a link with audio through their access module to ensure that it does not interfere with smooth audio flow.

SUMMARY OF THE INVENTION

The present invention takes advantage of switched Ethernet to transmit audio by means of a network to multiple nodes on the network. The invention provides:

Transmission of audio with no interruptions
Low latency in audio delivery
Implemented using off-the-shelf Ethernet switches
Audio signals share the network with data signals Broadcast studios have the requirement that disc jockeys be able to listen to themselves in headphones. Maximum tolerable delay is around 15 ms. There may be multiple links in the microphone-to-headphone path and maybe some processors, so each link has to have low delay in order to keep the cumulative effect below the threshold. Practice of the present invention comfortably achieves this latency requirement.

The invention accomplishes reliability and low delay by:
  Tagging audio packets with a higher priority value than data so network interfaces and switches can distinguish them and put the audio packets at the head in their queues or buffers. This is done on a per-packet basis, not by assigning particular Ethernet switch ports permanently to high priority so that a link may pass both high-priority audio and lower-priority data.
  Practice of the invention never allows link capacity to be overfilled. Terminals are in control of the streams they transmit and also the ones they request the switch to send them for reception. They have a function that calculates the link capacity, compares it to how much is already being used, and decides if there is enough space for more before connecting any new audio channel. This is in contrast to normal Ethernet operation, which is a "best efforts" system with no way to limit offered data.
  The invention uses a clock and PLL (phase lock loop) system to synchronize the audio bit-level transmit and receive clocks in terminals These and other objects, advantages and features of the invention are described with a degree of particularity in conjunction with the accompanying drawings.

BEST MODE FOR PRACTICING THE INVENTION

Figure 1:
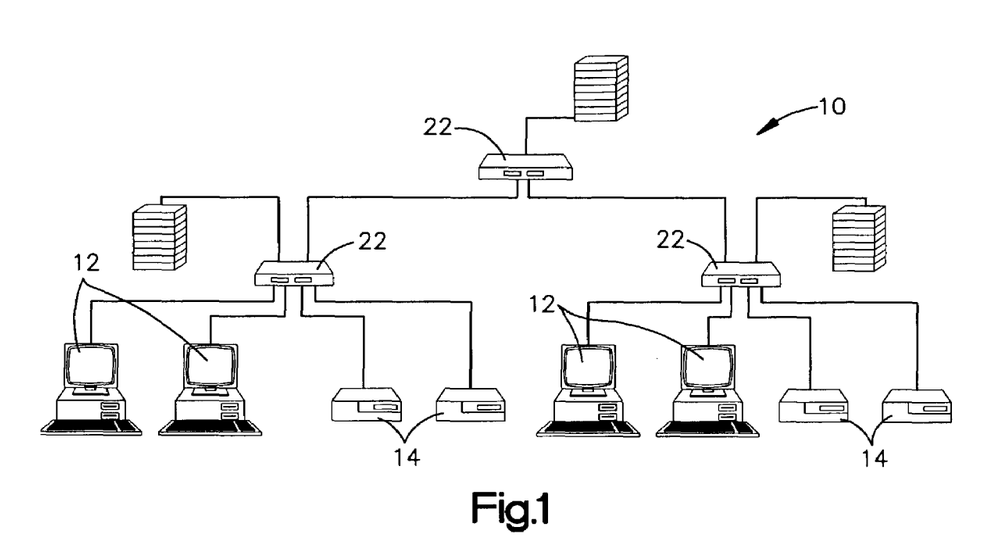
FIG. 1 is a schematic representation of an audio network constructed in accordance with the invention.
Figure 9:
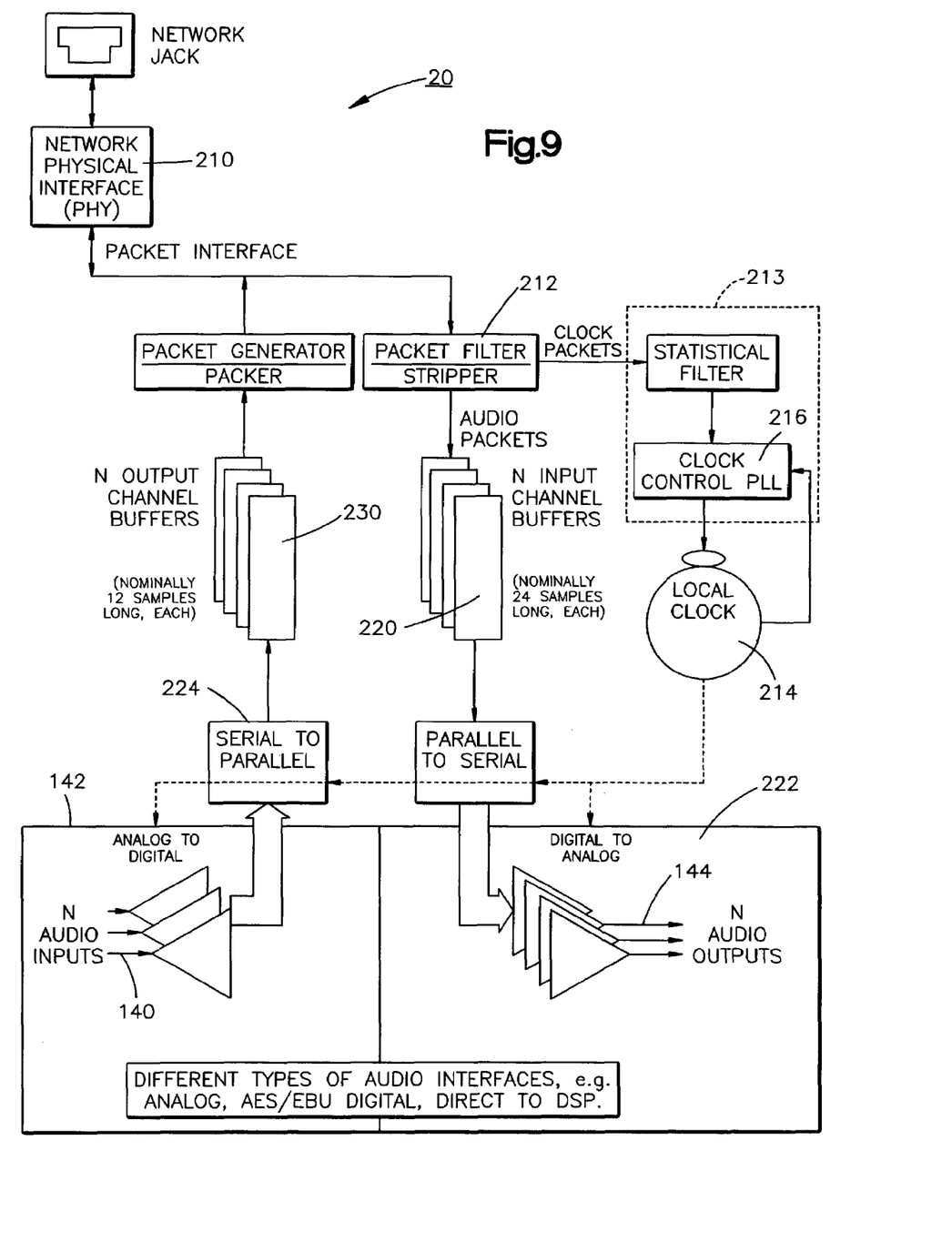
FIG. 9 is a block diagram of a node on the network of FIGS. 1 and 1A.

FIG. 1 is schematic depiction of a general architecture design of a network 10 that is used at a facility having multiple computers 12 and other audio equipment 14. The network 10 uses a switched Ethernet network for delivering both audio and data to any node (such as one of the computers 12) on the network. A node need not include an entire computer but instead may simply be circuitry that includes a network interface circuit and an audio jack for plugging in a speaker, set of headphones, microphone or amplifier. FIG. 9 is a functional block diagram of a typical node on the network 10.

Key to implementing the network shown in FIG. 1 is the use of priority tagging and the action of Ethernet switches 22 (three of which are depicted in FIG. 1) that deliver higher priority packets first before any waiting lower priority (non-audio) packets. Another design point is for each channel receiver (non-switch node) to have just enough audio data buffer to allow one full size (non-audio) packet to come through and not cause an audio dropout. The priority service action of the Ethernet switch will then guarantee that no further non-audio packets are allowed through until all delayed pending high priority audio packets are delivered.

The Ethernet switches 22 shown in FIG. 1 operate in conformity with IEEE standard 802.1Q-1998 and therefore recognize priority bits in the header of data packages that are transmitted between nodes of the network.

Figure 1A:
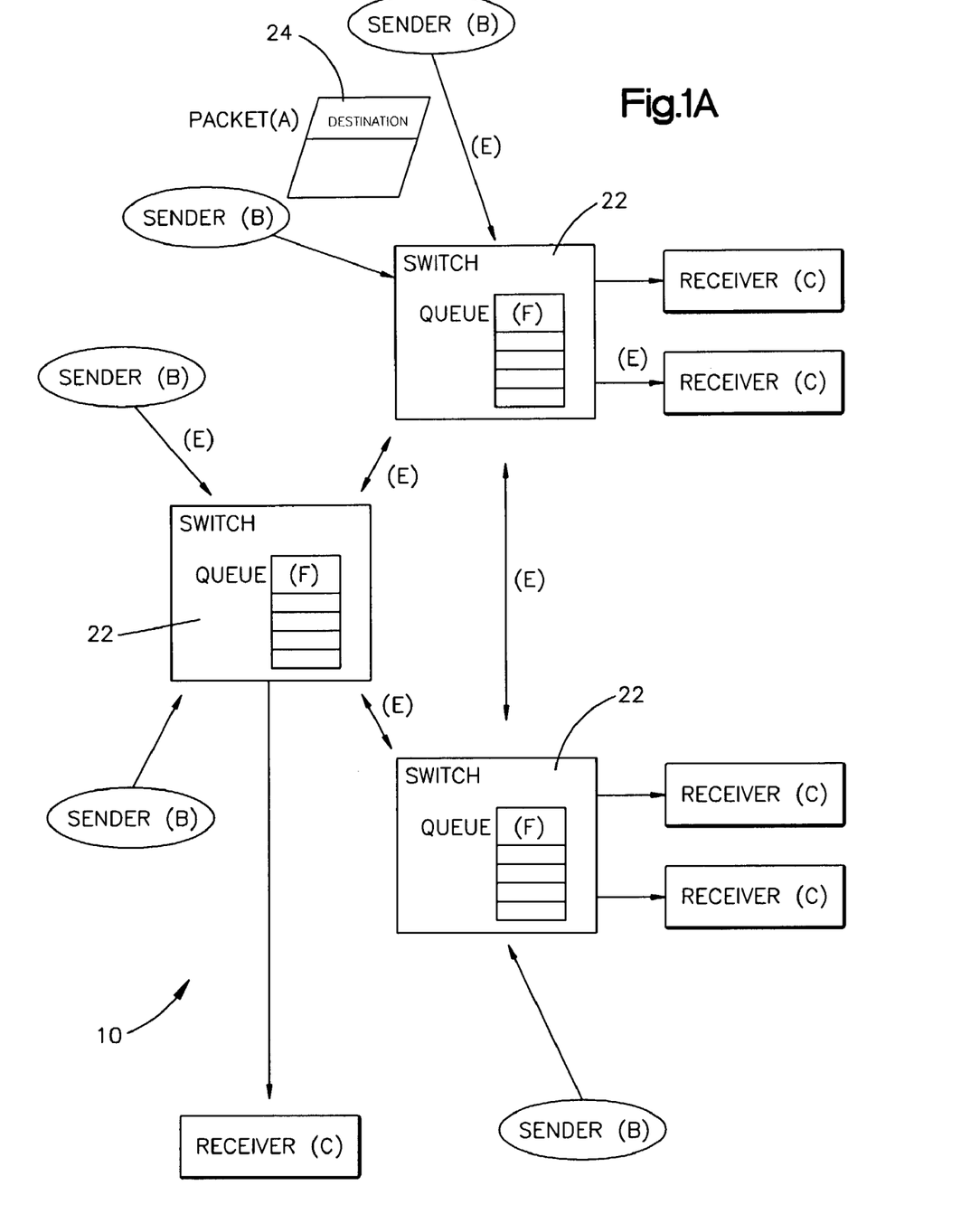
FIG. 1A is a schematic depiction of a packet switched Ethernet network.

Referring to FIG. 1A, Packet Switched Networks, in particular Ethernet, move groups of data, called packets (A), from senders(B) to receivers(C) over a shared network of communication media (wires, wireless, fiber optic, etc). Each packet A has information contained in it, called the destination address 24, that indicates which receiver C that packet is intended to go to.

Each of the senders and receivers includes a digital circuit for encoding and decoding packets as well as performing clock functions. Many packets may be sent into the network by many senders to any receiver concurrently, and packets proceed through the network to each receiver simultaneously. Intermediate nodes in the network, acting as switches 22 forward packets on toward their intended destinations using the destination address 24 in each packet. The communication links (E) between nodes are used in common for packets of many different destinations. Since the communication capacity, called bandwidth, is finite on these links, each packet takes a certain finite amount of time to be transmitted across a link, which means that other packets in the switches 22 that need to go down the same link must wait for the previous packet to finish. Many packets waiting in the switch 22 form a queue (F), and the overall amount of time spent waiting in these queues is called queuing delay or switching delay. Given a mix of many types of packets from many senders B to receivers C at many different times, means that these switching delays are generally not precisely predictable, and have a variable, chaotic, and even a certain amount of random behavior. Note, that due to the nature of the network, a sender becomes a receiver and vice versa as data is transmitted to the various network nodes on the network 10.

This switching delay, its magnitude, its variations, and its effect on the streams of data packets trying to flow through the Packet Switched Network is a problem addressed by the invention.

Effect on Digital Audio Streams

For a data stream, such as an audio program, the digital audio data forms a sequence of packets. Each packet represents a time ordered number of audio samples. In order to correctly reproduce the audio program, the receiver C must output each audio sample in its correct time order, at the set time interval in relation to other audio samples sent to a given receiver C. Any audio sample not output at the correct time, results in a distortion of the audio program, audible noise, and otherwise degrades the fidelity of the audio reproduction. Therefore, in order to communicate a digital audio program made up of a stream of packets over a packet switched network, the effect of the above packet switching delay and its variations, must be dealt with by the invention.

Low Latency Audio

Latency is measured as the overall delay from the input of audio to the output of the audio from a node 20 on the network 10. It is undesirable from a user's point of view to have too much audio delay introduced as a result of transporting audio from place to place on the network 10. Many audio programs rely on synchronization of many audio, video, and other parts of a program or presentation. Excessive delay causes sounds to not happen at the correct times, an aesthetically unpleasant result. In addition, listening to an audio program for the purpose of monitoring its correctness is affected by audio delay, as even relatively small delays can cause unpleasant, unnatural perceived effects. (For instance, speaking into a microphone while listening to yourself on headphones with an audio delay of a few tens of milliseconds, causes the audio in your ears to be out of phase with the sound coming from your mouth, which is distracting and unpleasant.)

Therefore, it is desired to be able to transport audio programs over packet switched networks with small enough latency (delay) in the audio so as to not produce these unwanted audio delay related effects. A numerical value for maximum acceptable delay to be regarded as 'low latency' is less than 1 millisecond for each traversal of the packet switched network 10.

Audio Buffering

Because of the variation in time of the delivery of data packets of the packet switched network 10, the receivers C (FIG. 1A) must hold a certain amount of audio data ahead of time in a buffer. If the correct time to output each audio sample is regarded as a time deadline, then the buffer holds the up and coming required audio data locally, so that the deadlines will be satisfied and no audio distortion can occur. The problem is that this local buffer in each receiver C directly adds latency to the audio, which is undesirable, and does not fulfill the problem to be solved, of delivering low latency audio.

In accordance with an exemplary embodiment of the invention low latency audio delivery is achieved by use of only just enough buffering chosen with a view to the particular characteristics of the packet switched network 10. This solution can be regarded as the minimum possible buffering for a given set of packet switched network characteristics.

Use of Network Packet Priority

Figure 2:
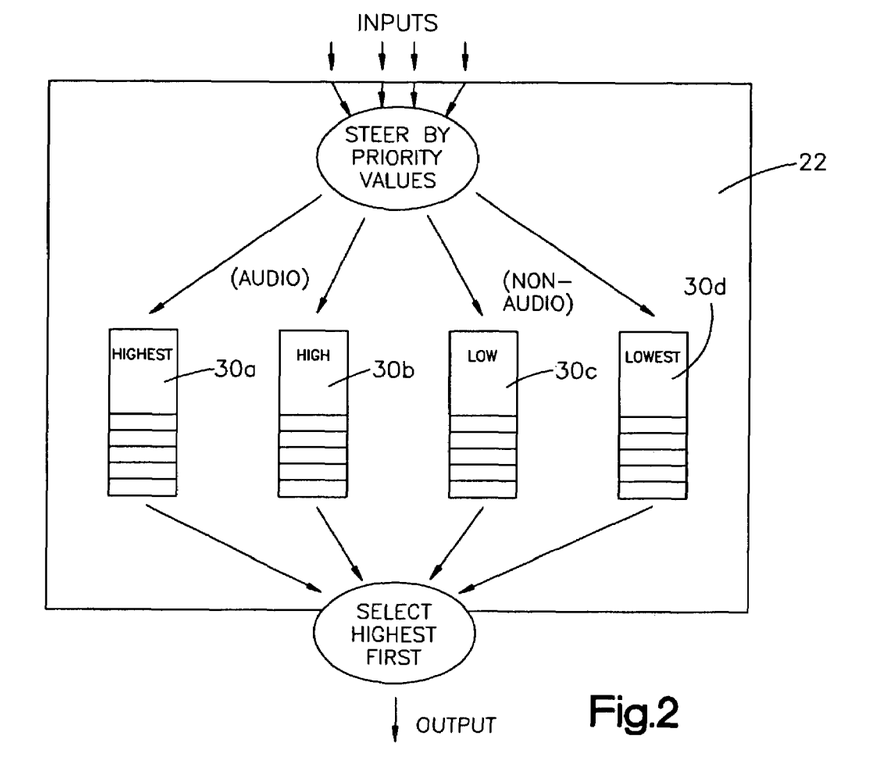
FIG. 2 is a schematic depiction showing multiple data queues having different priority.

Switched packet networks, in particular, switched Ethernet, allow a packet priority value to be assigned to each packet individually. When multiple packets are waiting in the queue to be sent, the switches 22 use this priority value to determine the order that the packets are sent out on each link. Without priority, the packets are sent in simple first in, first out order. With priority, the switch assures that a higher priority packet is never made to wait behind a packet with lower priority. One can think of a switch with the priority mechanism to have multiple queues, one for each priority, since packets belonging to the same priority level do queue behind each other. See the depiction of multiple queues 30a-30d shown in FIG. 2.

In accordance with an exemplary embodiment of the invention, a network 10 carrying mixed types of traffic (audio and non-audio), audio packets are assigned a priority value higher by a sender B than the non-audio data carrying packets. This guarantees that inside a switch 22, if there are any audio packets pending, they will be sent before all non-audio packets.

Queuing Delay with Priority

Assigning audio packets higher priority does not result in audio packets having no delay in the switches, since the case may happen that a switch 22 just began to send a lower priority non audio packet at the moment an incoming audio packet of higher priority arrived. Packet transmissions through a link are never interrupted once started, so the high priority audio packet that just arrived will experience a delay corresponding to the transmission time of the largest possible non-audio packet size. The transmission time of the largest packet possible is an important parameter of the exemplary embodiment of the invention for achieving low latency audio over a packet switched network with priority. This transmission time of the largest possible packet determines the minimum additional time that each receiver C must hold audio data in its buffer, determines the minimum buffer size, and thus determines the minimum latency possible for end to end audio delivery through the links of the network.

Determination of the Minimum Audio Receive Buffer Size

A time period, called the audio frame time period 100, is chosen as the fundamental interval of time at which packets of audio samples are communicated over the network. The smaller the audio frame period, the lower the end to end latency, but the higher the packet overhead, since sending even one audio sample requires the use of a minimum packet size. A choice is made to minimize the packet overhead, minimize the audio latency, and maximize the number of audio channels (which is the number of audio packets, one packet per channel) the network can carry. Since the audio latency is also determined by the above described Queuing delay, it is of little advantage to choose the audio frame period to be less than the Queuing delay. Therefore, in the exemplary implementation, the audio frame period is chosen to be 250 us, about twice the queuing delay. This results in each audio packet carrying 12 audio samples (sampled at 48 khz.)

The formula for the minimum buffer size at each receive channel is the sum of the audio frame time plus the transmission time of the largest possible packet times the number of intervening switches the audio path traverses. For the example of 100 base T Ethernet, the maximum packet size is nearly 1500 bytes (ignoring the header and inter-packet gap which adds a few dozen more effective bytes), which means the maximum transmission time of the largest size packet is (1500×8 bits per byte )/100,000,000 bits per second=120 microseconds. For the example of digital audio data sampled at 48 Khz, this means the minimum buffer size possible on a 100 base T Ethernet packet switched network is 120 us/ (1/48000)=5.75 rounded up to 6 audio samples per each switch the audio stream route passes through, plus the audio frame time.

The size of the buffers in the receivers C for minimum audio latency are computed according to the above formula. In the example of the network 10 of FIG. 1 having a maximum number of two switches between sender and receiver nodes, a frame time of 250 usec, or 12 audio samples at 48 Khz sample rate is chosen. Therefore the buffer size (in terms of audio samples) is the audio frame plus two times the transmission time of a maximum sized packet, or: 12+(2×6)=24 audio samples.

Buffers for storing incoming audio data of this size are contained in the receiver nodes that can receive audio.

Note that Ethernet switches 22 which are standard commercially available devices have larger buffers for storing data, but for a different purpose. The Ethernet switch needs the larger buffers to implement the priority scheme (and the queue construct of FIG. 2) set up by the priority bit (or bits) of an incoming packet. In the event that the switch 22 receives a higher priority packet that needs to be sent to a destination, any lower priority packets coming into the switch over other connections must be buffered.

Action of the Receive Audio Buffers: Recovery from Non-audio Packet

Figure 3:
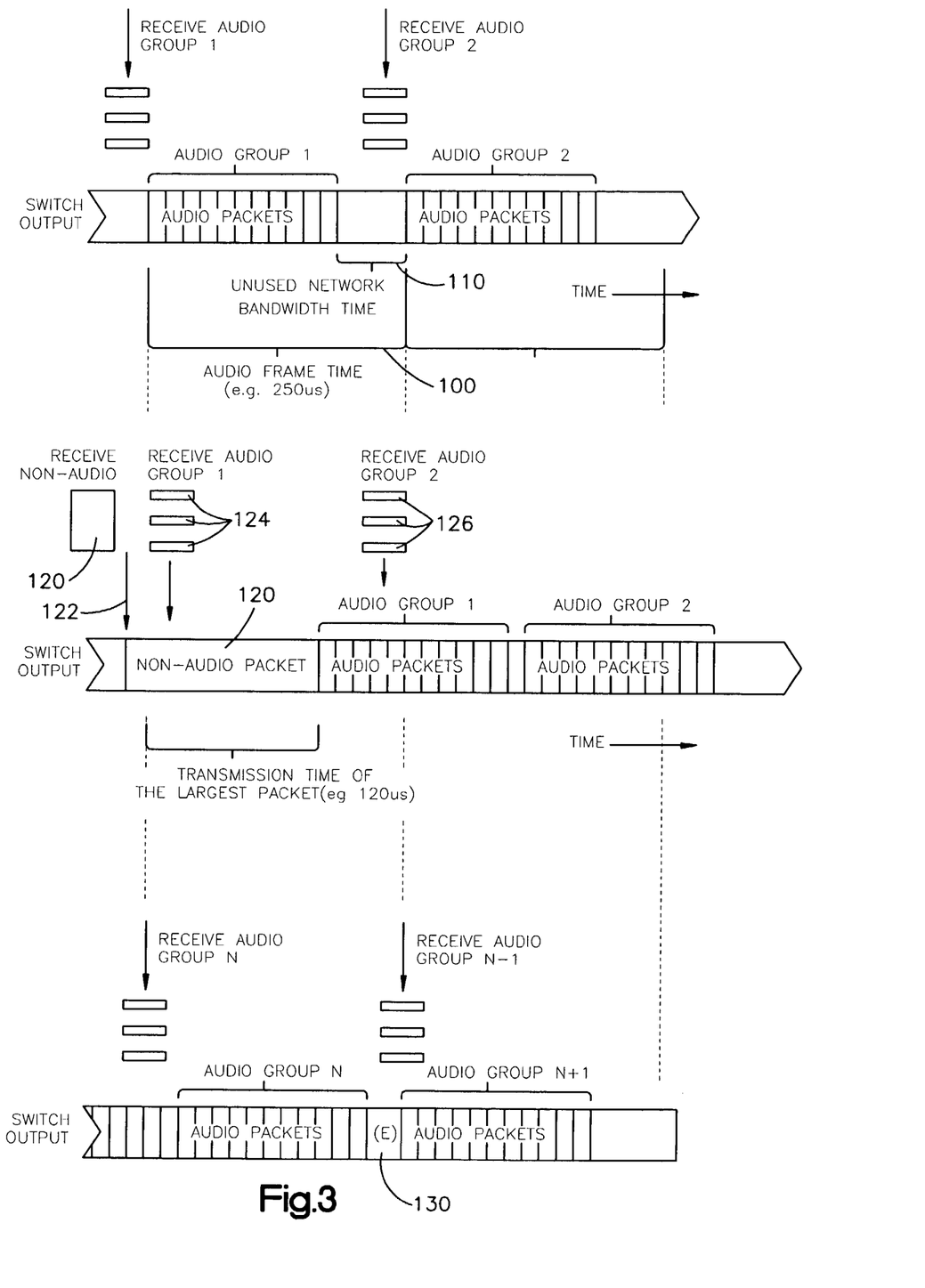
FIG. 3 is a schematic of three timed buffer contents showing a means of reducing latency of audio packets received at a node.

One can refer to FIG. 3 to understand how the behavior of the packet switched network 10 with priority packet designations allows such small buffers. Low latency is achieved, but the capacity of the number of audio channels of the network is not limited. Consider the behavior of the system when a maximum size lower priority non-audio packet 120 (120 usec) is interposed into the audio stream and results in delay of the audio packets.

Assume the number of audio channels almost fills up the entire capacity of the network bandwidth. Audio data is sent in packets holding a constant, chosen number of samples (chosen above to be 12), called the audio frame time 100 on the horizontal axis of FIG. 3. The time left over is called the unused network bandwidth time 110.

Consider a situation shown in FIG. 3. At the very moment 122 a non-audio packet 120 is starting to be sent, a large group of audio packets 124 arrive at the switch 22. All the audio packets 124 must wait for the non-audio packet before they begin to be sent. Notice that the next following group 2 of audio packets 126 begin to arrive at the switch before the previous group (the group delayed by the non-audio packet), have been sent. This next group of packets 126 simply queue's up at the higher audio priority behind the previous audio packets in the progress of being sent. Note, that at the completion of the first group of audio packets there is no opportunity for a non-audio lower priority packet to be sent before the second group of audio packets, since at that moment the higher priority of the already present audio packets 126 precludes any lower priority transmissions. Succeeding groups of audio packets continue to arrive before the previous audio packets have been sent, each groups being sent with less and less delay, by the incremental amount of the unused network bandwidth time 110. Eventually, after enough audio group times 'N', the switch 22 is 'caught up' with the pending audio packet transmissions, and there becomes a gap 130 in the audio packet transmissions. This then allows the next lower priority non-audio packet waiting in the low priority queue of the switch to be sent to the outgoing network link, and the above process repeats. The value of N is the quotient of the transmission time of the largest packet divided by the unused network bandwidth time An important fact to observe is that at no time is an audio packet delayed in transmission to a receiver C by more than the transmission time of one maximum sized non-audio packet, even when there were more non-audio packets waiting to be sent, so that the audio packets consume most of the available network bandwidth.

Network Timing

At a network node 20 where analog audio signals originate, the node 20 receives as input an analog audio input 140 (See FIG. 9). Digital audio is sampled from the original analog with a converter 142 that measures the amplitude at regular intervals and passes this value (as a digital signal) on to the subsequent network node such as a node with a speaker as an output device coupled to an audio output 144. When the digital signal needs to be turned back into analog, there is a reverse process performed by a converter that makes analog signals from the input numerical values.

To reduce delay and ensure reliable audio, a common sampling clock must be used system-wide by nodes 20 on the network shown in FIG. 1. If each converter had an independent clock, the slight differences in the rate would mean that a buffer would be needed at the receiver, and even so, after some time the buffer would eventually over or under-flow and the audio would be interrupted.

In accordance with the invention, one terminal or node is designated to be the master clock source and implements a master clock 150 to which all the other nodes 20 are locked. (If the master clock is unplugged or fails, another node automatically takes its place in a seamless fashion.) A clock packet that contains a time value 152 is periodically sent by the source node but unlike the prior art patents referenced above this packet is not used to create time slots or to order the outputs of the transmitting terminals. Such control is not needed, because the invention uses switched Ethernet rather than a shared medium and has no need for timed access. The clock packet is not transmitted at the beginning of a sequence of audio packets. Rather, it is transmitted at a much lower rate and a PLL (Phase Locked Loop) circuit at each of the nodes increases the rate to provide a synchronized audio sample clock in receiving terminals or nodes.

Recovering Digital Audio Synchronization

The ability to recover digital audio synchronization at multiple stations or nodes on the network relies on specialized statistical filtering of received timestamped clock information packets. Because packet switched networks can introduce a variable routing delay, a variable time delay is introduced into the communication of timing information, which would cause a variable timing synchronization error in all receivers. However, because the packet switched network can only add delay, it can never deliver a packet 'early'. This error is biased, and therefore can be mathematically filtered out.

Any devices communicating digitized audio information must operate off of an identical time base, or the digital audio information exchanged will not be able to be output, mixed, or otherwise combined with other audio channels. (A straightforward solution of using sample rate conversion for each audio data stream has the undesirable penalty of creating audio delay due to the buffering required by the mathematical conversion filtering process.) Therefore, a desirable solution is to have a clock circuit in each device or receiver station which are all synchronized together to a common time reference. However, in order to synchronize clock devices, information must be communicated between them, allowing them to be adjusted to be synchronized. This synchronization information is itself sensitive to timing errors, that is to say time delays in the communication of synchronization information will prevent proper time synchronization.

Packet switched networks have the property of delivery of packets of data with a variable time delay, dependent on the amount of network traffic. Since the network 10 transmits a mix of many types of packets from many senders to receivers at many different times, the switching delays experienced by clock packets are generally not precisely predictable, and have a variable, chaotic, and even a certain amount of random behavior.

This switching delay, its magnitude, its variations, normally prevents effective communication for use in synchronization of clocks, and is the fundamental problem to be solved in order to achieve node synchronization.

Figure 4:
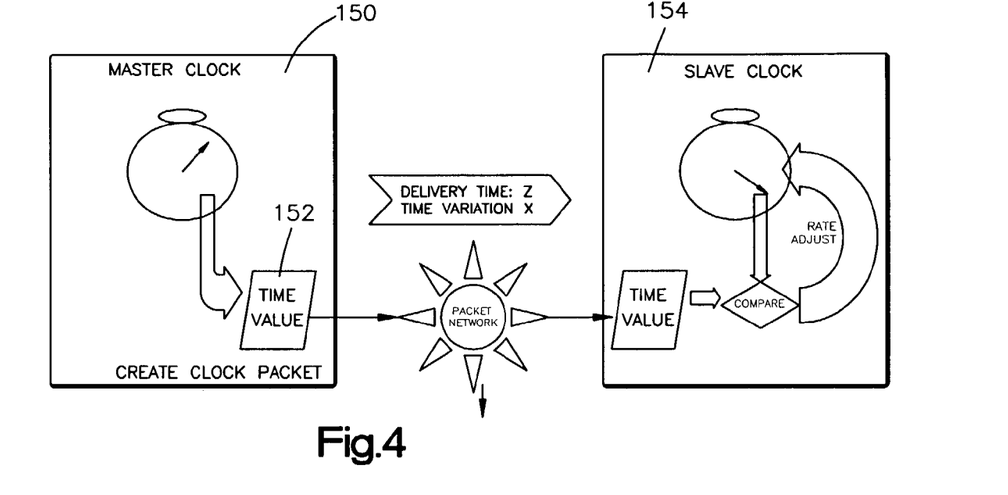
FIG. 4 is a depicts a timestamp method of clock comparison and synchronization.

Referring to FIG. 4, in order to synchronize multiple clock devices, one device is chosen to be the master and implements a master clock 150, while all other devices become slaves which must follow and synchronize to the one master by implementing a slave clock 154. Choosing which device will be the master may be a manual operation, or an automatic one determined by a predetermined protocol exchanged via the communication network 10 in the event of a failure of the master. In one exemplary process after a timeout delay of receiving no clocks, the master clock 150 is assumed not functioning any longer, and every possible new master transmits a preliminary clock message. If there are more than one new clock master candidate, the candidates vote themselves off in favor of the master detected with highest merit. In this embodiment the master with highest merit is determined from an assignment of unique values to each device, for example, such a the lowest ethernet network address value.

The master marks and communicates time reference moments to all slaves, by a broadcast or multicast method of addressing all slaves with one packet. This packet contains a time reference count, called a timestamp value 152. This timestamp value 152 is a measure of time made by the master clock device in arbitrary time units. It is important that the value 152 is to be of high enough resolution to allow very small time differences or errors to be calculated by the slaves. In the exemplary implementation, the timestamp is in units of $1/12{,}288{,}000$ Hz (approximately 80 ns).

Once the measure of the local clock time is made by the master clock 150, the resulting data packet (called a clock packet) is sent to the packet network 10 for communication to all the slaves. Each slave, when it receives a clock packet, measures it own local clock device 154, for comparison to the master clock reference value 152 communicated inside the packet. In order to synchronize the slave clock 154 to the master clock, successive comparisons between the master and slave clock values are made at the slave node. If the comparison value is getting larger over time, then the slave clock 154 is running too fast, and a rate control adjustment is made to slow the slave clock down, and vice versa if the slave clock is found to be running too slow, a rate adjustment is made to speed it up. The specific formulas used to calculate the amount of rate adjustment given the amount of observed comparison differences over time, may be many different standard control algorithms, including standard second order PLL (Phase Lock Loop), or PID (Proportional Integral Differential) control algorithms that are implemented in software.

If there was no variation in the delivery time of the clock packet via the packet network 10, then implementation of this method alone would result in a perfect synchronization between the slave clock 154 and the master clock 150, besides the constant network transit delay, which could be measured and subtracted out. However, the variation of the clock packet delivery introduces an error in the measurements.

Delivery Time Variation

In order to overcome the effects of the packet delivery time variation unknown 'X', some observations can be made of the value of X: X is always greater than or equal to 0. X can never be negative. This means that X represents biased error in the time communication, and therefore this bias may be filtered out using a mathematical filter to eliminate it.

Another way of viewing this packet delivery time variation filter is to observe that the time variation comes from additional delay in the packet network which is a result of other packets traversing the packet network at the same time as the clock packet. Specifically, the time variation for the clock packets is the sum of the queuing delays in the switches 22 resulting from all other packet traffic. We may assign the clock packets the highest priority, (see discussion above regarding priority assignment), but there will still be the queuing delay caused by the sending of lower priority packets in progress when the higher clock packet arrives in the switch. A key observation is that if at the moment the clock packet arrives in the switch there are no other packets in progress of being sent, then the clock packet will be sent out immediately with minimum delay. Therefore, at the receivers, over time some of the clock packets will have arrived delayed by other packet traffic, and some will arrive not having been delayed by other packet traffic. By determining which clock packets had been delayed, and which had not, the time measurements of the packets that had been delayed can be simply ignored, and local clock rate adjustment calculations made based solely on the non-delayed clock packets (that is the clock packets for which the time variation 'X' introduced above is zero or minimum.

Determining which Clock Packets to use

To determine which clock packets have been subjected to queuing delay as they traversed the packet network, and which had not, the invention collects a set, or ensemble of clock packets in each receiver C.

The size of this set that must be collected is determined by the statistics of the traffic on the packet network in use. The size of the set must be large enough so that given the variations of delivery time, the probability of at least some of the clock packets having been received without extra delay is significantly close to 1. There at least two methods for calculating an estimate of this probability.

Figure 5A:
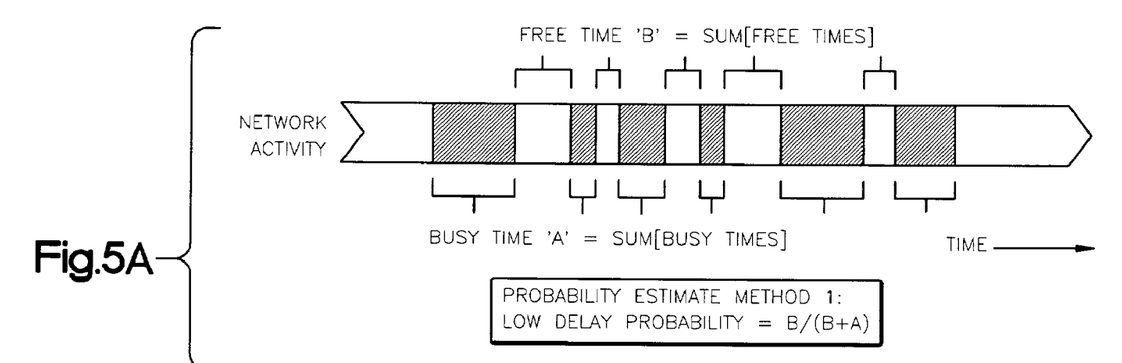
FIGS. 5A and 5B are depictions showing methods of estimating probabilities of clock packets arriving with minimum delay.

Referring to FIG. 5A, a first method estimates the probability is based on a determination of the ratio of network free time B as a percentage of all time B+A. Given the expected network traffic density, this method chooses the time interval of collecting the clock packets such that the probability of having network free time is greater than zero.

For example, if the sum total traffic on the network is at 50% capacity, then roughly half the time a packet will be in transit coincident with other packets and may see a delay, but the remaining portion of the time it may not. Packet traffic tends to be bursty, with time periods of high capacity volume, followed by low volume. In these cases the typical time intervals of the bursts is more important than the measure of average network capacity used.

Figure 5B:
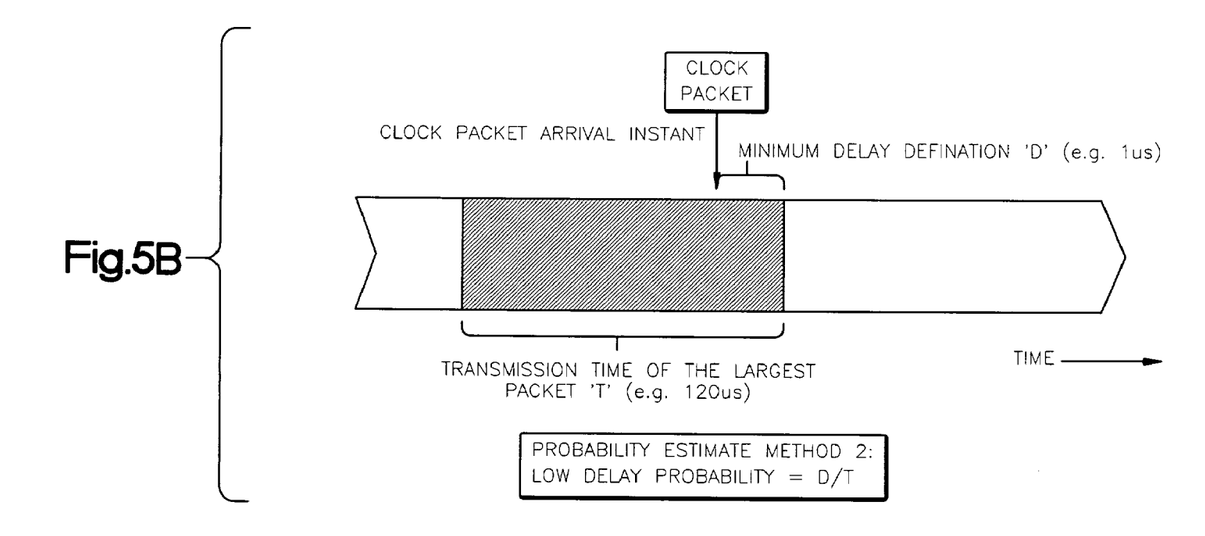

A second probability estimate illustrated in FIG. 5B is derived from a property of the behavior of the packet Ethernet switch that determines the probability of high priority clock packets propagating through the links of the network with minimum delay: The ratio of the desired definition of 'minimum' delay to the transmission time of a maximum size packet. From the moment a high priority clock packet arrives in the switch, it will be next to be sent out by virtue of its high priority, but must wait for any current packet then being transmitted to complete. If we define a 'minimum' delay to be say 1 usec, and the maximum packet is 120 usec long (for 100 bt Ethernet), then the probability over time that a clock packet will arrive less than 1 usec before the end of the previous packet transmission is complete is $1/120$. Therefore even with network capacity at 100%, if we collect 120 clock packets, the odds will be close to certainty that at least one of the clock packets has experienced a delay less than 1 usec in the switch.

For a packet switched network carrying digital audio traffic streams of some amount, say 80% capacity, plus command and control information for those digital audio devices, an exemplary system has a very high probability of some clock packets arriving with minimum variable delay by collecting between 50 and 250 clock packets over an interval of 200 milliseconds to 1 second.

Histogram Filtering

Figure 6:
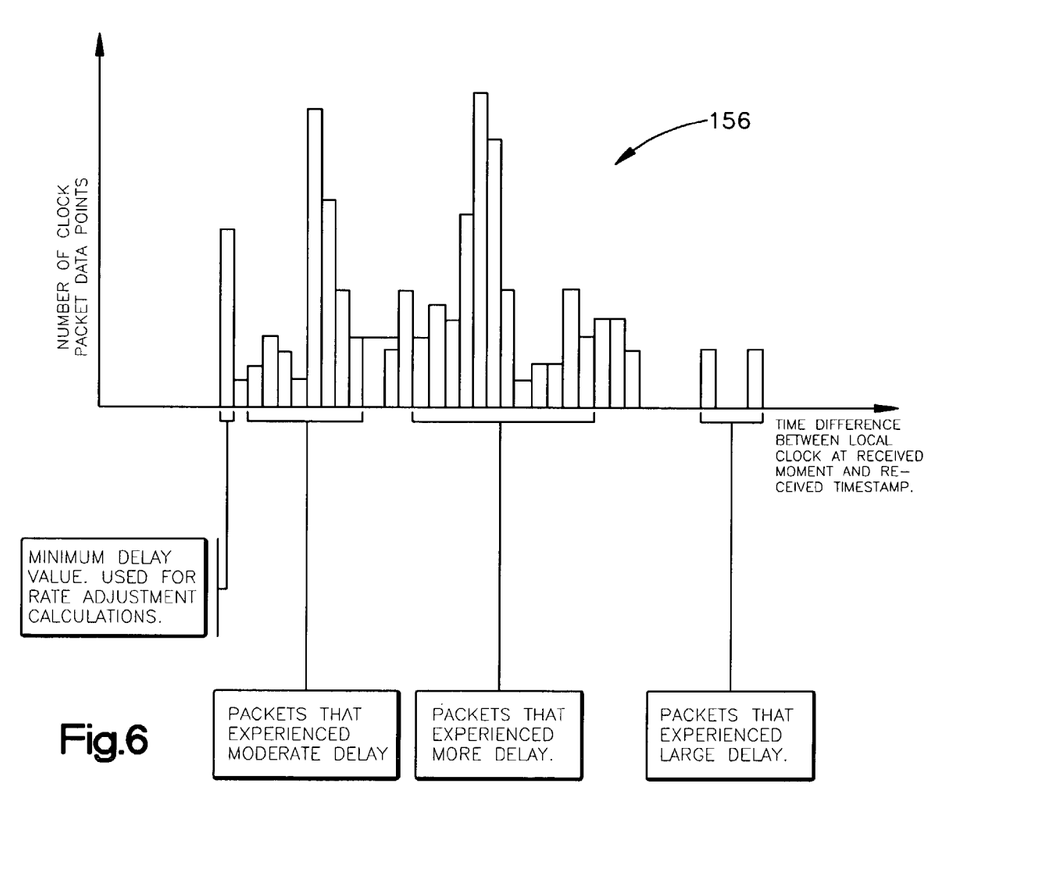
FIG. 6 is a histogram of clock packet time offsets.

Referring to FIG. 6, once the set of clock packets is collected, observe a histogram 156 of the comparisons made between the master clock and the local slave clock. It is observed that the set of time comparisons will be spread from a minimum to a maximum value. Since both the master 150 and slave clocks 154 are stable relative to real time (they only differ in rate), the variation may be attributed solely to the variable network delay. Therefore, the time measurement values at the minimum range of the histogram are the clock packets that experienced the minimum extra network delay. All other packets may be ignored, and the values from minimum end of the histogram are used to perform the slave clock rate adjustment calculation discussed previously.

In practice, since it is known ahead of time that at the end of the histogram process, the process only uses the minimum range value, it does not need to store the data for the entire histogram. Rather, it simply finds the minimum time difference value of the set of clock packets as they arrive.

The exemplary embodiment of the invention uses a novel design for transmitting timestamped clock references on packet switched networks allowing optimal clock synchronization recovery that is particularly advantageous for use with audio data transmission. The disclosed exemplary embodiment of the invention uses a process for sending timestamped clock references, which optimizes clock recovery when using a statistical filtering synchronization scheme in each receiver.

In order for clock synchronization using statistical filtering of clock packets to operate correctly, the probability of at least some clock packets arriving with minimum delay (i.e. no extra switch queuing delay) must be close to 1. This probability is an interaction of the characteristics of the network traffic, and the characteristics of when and how the clock packets are sent. The characteristics of the network traffic is regarded as outside the control of the system (in order to not place constraints on the system). The design of the transmission of clock packets is made to optimize the required high probability.

Design Requirements of the Transmission Pattern of Clock Packets

Given that the delay that a packet switched network adds to any given packet is a function of the other traffic on the network, the delay statistics of the network are really the statistics of all the other traffic on the network. Without attempting any overall media access control, or proscribing any overall restrictions or traffic grooming on the overall traffic on the network, it must be assumed that the overall traffic pattern is arbitrary and random. Because the overall traffic patterns are arbitrary, there may indeed be traffic patterns that have pronounced repetitive periodic pattern, bursts, or long streams of bursts. It cannot be assumed that overall traffic is statistically 'random' in the sense of lacking structure, it may have pronounced, (but arbitrary) structure.

For correct operation, the pattern of transmission of timestamped clock reference packets is chosen so that at least some of the time the clock reference packets traverse the entire network to the intended receivers with minimum delay. Note any given clock packet broadcast onto the network by the master does not have to reach all receivers with minimum delay, it is sufficient that at least some of the time some clock packets reach each receiver with minimum delay.

Network Traffic Patterns

Figure 7:
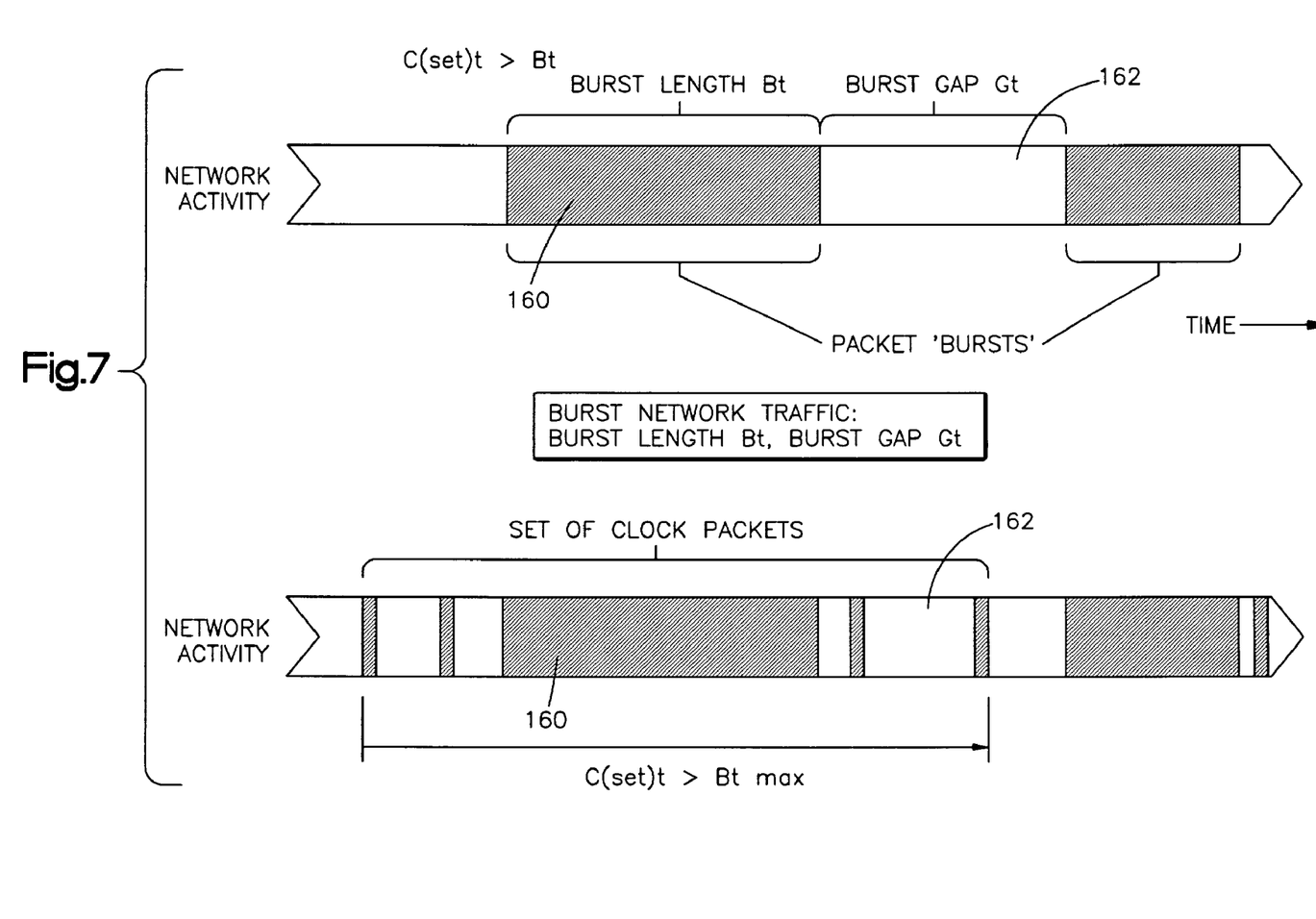
FIG. 7 is an example of clock packet transmission designed to overcome Bursty Network Traffic Pattern on a network.

Referring to FIG. 7, the network traffic is undefined, but is not completely random. Two dominant traffic commonly appear that are characteristic of a wide class of data flows:

Bursty Traffic Pattern

Bursty traffic is when a relatively large amount of data needs to be transferred, but only once. When the data transfer is demanded, it may take many packets of network transfer to complete the required data transfer, and these all complete with as minimum delay as possible. Therefore, a group of transfers happens together (a burst), until the overall data request is complete, and then the network transfers stop. Network protocols like TCP/IP have mechanisms to spread out these bursts somewhat, to promote sharing of the network even during large bursts. The characteristics of bursty network traffic are the statistics of the burst length (Bt), and the time gaps between the bursts, called the burst gap (Gt).

In order to have a reasonable probability of at least some clock packets of a set traversing the network with minimum delay, the length of time covered by the set of clock packets C(set)t, should be greater than the maximum expected burst length time Bt. Otherwise, all the clock packets of a set may be delayed by the existing network burst. In practice, if the priority of the clock packets is set higher than the bursty network traffic, than this constraint on the design of the clock packets set size may be relaxed.

Isochronous Traffic Pattern

Figure 8A:
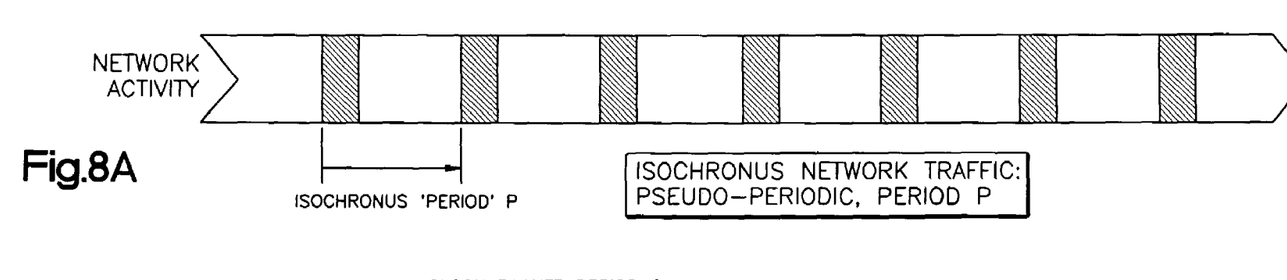
FIGS. 8A, 8B and 8C are depictions of clock packet transmissions designed to overcome Isochronous network traffic.
Figure 8B:
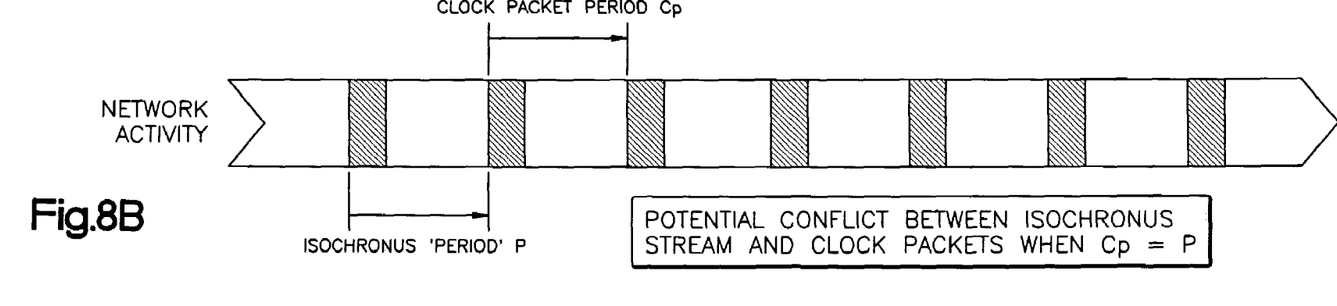
Figure 8C:
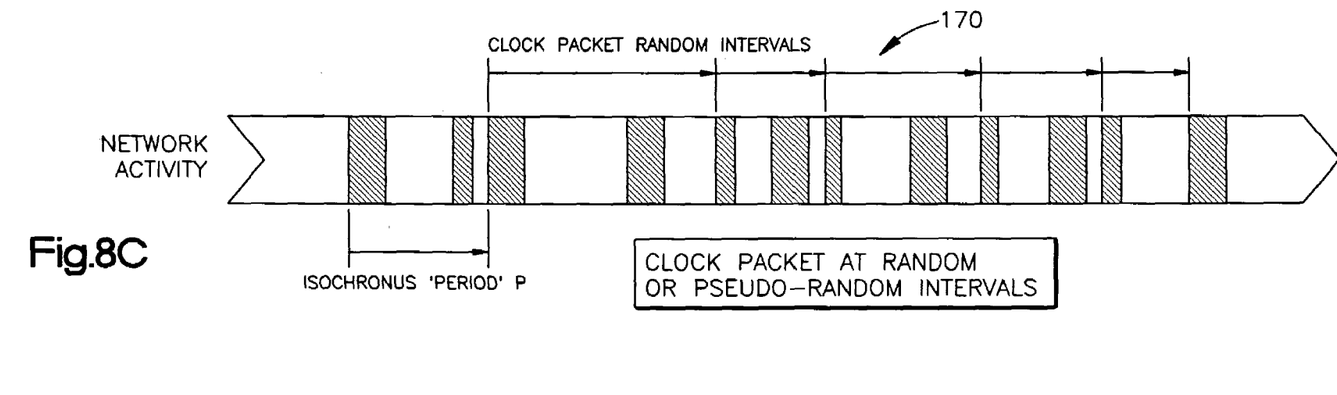

Referring to FIG. 8, Isochronous network traffic is when a certain amount of data is transferred periodically by the network. The 'iso-' name comes from the fact that these data transfers are not in exact synchronization with time, since the variable delay of packet network delivery prevents this. They are approximately periodic in time, having a period P and may continue to exist for extended or indefinite periods of time (that is, they may never stop). Many multimedia streams carried on networks form isochronous traffic patterns.

Note that when a bandwidth sharing algorithm, such as TCP/IP controls a large burst transfer in order to throttle back and use less network bandwidth, it may for a certain duration, create a stream of packets, spaced out at some pseudo-interval. This is not true isochronous traffic, but it has the same potential for colliding with and disrupting clock packets.

The isochronous traffic pattern has the greatest potential to disrupt the communication of synchronization information over the packet network. This is because the potential exists that any isochronous stream may happen to have the same or similar interval as chosen for a given set of clock packets communicated for the purpose of clock synchronization. In this case, even if the clock packets are set to a higher priority than the isochronous stream, each and every clock packet may still experience queuing delay in a switch 22, since at each and every moment a clock packet arrives at the switch, a packet from some isochronous stream may have just started transmission. This 'accidental correlation' between the isochronous streams and the clock packet sequence period Cp is avoided by practice of the present invention.

Clock Packet Transmission Pattern Solution:

Any regular, periodic pattern of transmission of timestamped clock references is disqualified since it may run into conflict with one of the arbitrary overall existing isochronous traffic patterns.

A pattern of random intervals 170, or sufficiently pseudo-random interval pattern is chosen for the transmission of the timestamped clock reference packets. Statistically, this ensures on the whole, that at least some of the clock reference packets will reach each receiver free of conflict from overall other traffic, and fulfill the requirements for allowing clock synchronization recovery. These random intervals are determined in software or hardware by the node designated as the master and at the beginning of each such interval, the node broadcasts a timestamped clock packet onto the network 10.

Node Functional Block Diagram

There are two signal flow paths represented in a node 20 depicted in FIG. 9, receive and transmit. The receive path flows from top to bottom, and the transmit is bottom to top.

Receive Path:

Ethernet PHY

The receive path begins with packets coming in from the ethernet network via the Ethernet Physical Interface 210. This devise transcodes the particular electrical, wireless, or optical signal format used for transmission between nodes, into standard digital logic signals. The Ethernet physical interface 210 presents the data of the incoming packets to a packet receiving circuit.

Packet Filter

A packet filter 212 tests the data in each received packet of data to see if it belongs to one of the audio streams, or contains clock sync information, or not. If neither audio nor a clock packet, the packet either represents non-audio data for that node or is addressed to another node. If the packet contains non-audio data a node processor interprets that data in a conventional manner. The packet filter does this by comparing the destination address contained inside the data packet, with a list of destination addresses that the receiving terminal is programmed to accept. The list of accepted destination address numbers is programmed by a node processor 213 into the packet filter ahead of time depending on which audio channels from the network the user desires to come out of the outputs of this audio receive terminal. If the packet address does not match any of the accepted destination addresses on the list, no further action is taken on that packet and it is simply ignored. If the packet address does match an accepted address on the list, which address it matches determines the next step of processing the incoming packet.

Clock Packets:

If the destination address matches the address for clock packets, then a time measurement of the local clock 214 is triggered, and the local time clock value along with the received clock packet contents is stored. This storage event notifies the software running on the node processor that a new clock packet has arrived. Software on the node processor reads the clock packet information and compares the local clock to the remote master clock by performing a histogram statistical clock filtering algorithm. The clock filtering algorithm may result in a decision to adjust the local clock to make this local clock 214 either faster or slower using a software implemented phase lock loop 216.

Audio Packets

If the packet destination address matches one of the audio channel addresses on the list, then that packet is routed and stored into a corresponding audio channel buffer 220. That is, if the audio packet address matches the first audio channel address on the list, then the audio data is put into the first audio channel buffer, matching the second address on the list goes into the second audio channel buffer, and so forth The audio channel buffers 220 are maintained in FIFO order, and read out at a periodic rate determined by the local sample clock, serialized, and sent to the Digital to Analog (D/A) converter 222 to be converted into an analog audio signal output 144 (or sent to an AES/EBU transmitter to become a standard digital audio signal).

Effects of Clock Synchronization Note that if the local sample clock is running faster than the remote master clock, the audio channel buffer will be emptied by the D/A converter 222 faster than it is filled from network audio packets, which results in underflow and an interruption of the audio. Likewise if the local sample clock is running slower than the remote master clock, the audio channel buffer will become full, resulting in overflow and likewise a loss of audio data. Both of these conditions are avoided by the proper synchronization of the local clock 214 to the remote master clock 150 so that the net empty and fill rates of the buffers is the same.

Receive Channel Buffer Initialization

Also note that the receive audio channel buffers 220 must be properly initialized so that they contain the chosen average amount of audio data corresponding to the buffer size outlined previously. The maximum capacity of the FIFO is not the buffer size we desire (for the example of 24 audio samples outlined). What is required is 24 You are correct, FIG. 9 is wrong. The 'N input channel buffers' should show nominally 24 samples each. The 'N output channel buffers' should remain nominally 12 samples each)) audio samples contained in the FIFO at the moment of the beginning of an audio frame period. The maximum capacity of the FIFO memory may be any number larger than the required buffer size, and is not an important parameter of this design.

One of at least two methods may be used to initialize the receive FIFO audio buffers 220. The first method is to empty the buffer, while disabling the output. Then, after 24 samples (2 nominal audio frames) have come in from the network, enable the output. The second method is to directly manipulate the internal FIFO memory storage pointers. At the moment the FIFO begins to be filled, set the output pointer equal to the input pointer minus 24 audio samples (or alternatively at this moment set the input pointer to the output pointer plus 24 audio samples). Both of these methods will initialize the received audio channel buffer FIFO to have nominally the chosen buffer occupancy size. The receive channel buffer is implemented in certain nodes using a field programmable gate array (FPGA) commercially available from Xilinx. It includes memory for the buffers and programmable logic for maintaining those buffers. Other nodes, such as PC based nodes implement these buffers completely in software that interaces with a standard network interface card.

Transmit Path:

Transmit data originates from the Analog to Digital converters 142 (A/D) transcoding analog audio into digital numerical values (or digital numerical values may be received directly from AES/EBU digital audio receivers. This data is received serially, converted to parallel by a converter 224 and stored into an appropriate transmit audio channel buffer 230. The transmit audio channel buffers collect enough audio samples to form a complete audio packet. (In the exemplary embodiment this is the data for 12 audio samples). When there is enough data in the buffer for an audio packet, the packet transmit is triggered. The packet generator takes the audio data out of the channel buffer and builds an audio packet, adds the packet header information, computes and adds a CRC check value to the end, and sends the packet to the Ethernet physical interface 210. When the audio packet is created, the audio data from channel buffer 1 is given the packet destination address for the first output audio channel, buffer 2 is given the address for channel 2, and so forth. The destination addresses are determined by the node processor software ahead of time and programmed into the packet generator, as the user configures how the audio channels are to be configured for routing.

The Ethernet physical interface 210 transcodes the packet data into signaling to the network connection (wires, wireless, or fiber optic).

Note that since both the timebase of the generation of the audio data from the A/D converter 142 and the timing of determining when it is time to send the audio packets to the network, are both determined from the local sample clock 214, the buffer synchronization of the transmit mechanism is much simpler than the mechanism for initializing the buffers for receive. It is sufficient to simply wait for the transmit buffers to be full enough, and then transmit audio packets.

While the invention has been described with a degree of particularity, it is the intent that the invention include all modifications and alterations falling within the spirit or scope of the appended claims.

What is claimed:

1. A process of synchronizing events on a packet switched network by:
maintaining a master clock at a master node of a packet switched network of interconnected nodes including one or more nodes for converting analog audio input to digital audio packets and also including one or more nodes for converting the digital audio packets to analog audio output;
encoding high priority timing packets for transmission from the master node to one or more other nodes on the packet switched network and sending out a multiplicity of said timing packets onto the network at pseudo-random intervals to increase a probability that at least some of the timing packets arrive at the one or more other nodes after traversing the packet switched network with a minimum network transit delay time; and
at the one or more other nodes, filtering the timing packets received with the least timing error by finding a minimum network transit time from a set N of multiple timing packets sent between the master node and the one or more other nodes, by finding the minimum time offset from the set, of multiple timing packets where N, the size of the set is chosen such that given a probability,
$P=T_{min}/T_{maxpacket}$, where
$T_{min}$= a desired minimum delay on the packet switched network and
$T_{maxpacket}$= the transmission time of a maximum sized packet on the packet switched network,
then choosing $N \approx 1/P$ so that it is almost certain at least one packet in the set will arrive with minimum network transit delay; and
then using only the timing packets received with least timing error to synchronize the local clock maintained at the one or more other nodes, to the clock at said master node.

2. The process of claim 1 wherein the synchronizing of a local clock is performed at each node by a digital phase lock loop that uses time comparison information from the timing packets received with least timing error introduced by the packet network transit delay time, to compute a rate control adjustment to bring the local clock at the node into synchronization with the master clock.

3. Apparatus for synchronizing events on a packet switched network comprising:
a master node of a packet switched network of including a digital circuit for implementing a master clock that encodes timing packets for transmission onto the packet switched network and sends out a multiplicity of said timing packets onto the switched ethernet network pseudo-random intervals to increase the probability that at least some of some timing packets traverse the packet switched network and arrive at the one or more other nodes with a minimum network transit delay time; and
a plurality of other nodes on the packet switched network wherein one or more other nodes convert analog audio input to digital audio transmission packets and also including one or more other nodes for convening the digital audio transmission packets to analog audio output, each of said other nodes having a processor for determining from a set of N timing packets received from the master node a least timing error by finding a minimum network transit time between the master node and the one or more other nodes, by filtering the minimum time offset from the set of N multiple timing packets, where N, the size of the set is chosen such that given a probability,
$P=T_{min}/T_{maxpacket}$, where
$T_{min}$= a desired minimum delay on the packet switched network, and
$T_{maxpacket}$= the transmission time of a maximum sized packet on the packet switched network,
then choosing $N \approx 1/P$ so that it is almost certain at least one packet in the set will arrive with a minimum network transit delay:
and then said processor using only a timing packet received with least timing error to synchronize a local clock at one of the other nodes to the master clock.

4. The apparatus of claim 3 wherein the one or more nodes comprises a digital phase lock loop that takes time comparison information from the timing packets received with least timing error introduced by the network, and computes a rate control adjustment to bring the local clock at a node into synchronization with the master clock.

* * * * *